(12) United States Patent
Stahl et al.

(10) Patent No.: US 6,434,841 B1
(45) Date of Patent: Aug. 20, 2002

(54) PULLEY ALIGNMENT TOOL

(75) Inventors: William H. Stahl; Max E. Israel; David P. Wildemann, all of Columbus; Richard D. Young, Indianapolis; Richard Beach, Columbus, all of IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/563,033

(22) Filed: May 1, 2000

(51) Int. Cl.[7] .............................................. G01B 11/27
(52) U.S. Cl. .................................... 33/286; 33/DIG. 21
(58) Field of Search ......................... 33/203, 227, 228, 33/263, 286, 645, DIG. 21

(56) References Cited

U.S. PATENT DOCUMENTS

| | | | |
|---|---|---|---|
| 2,108,077 A | 2/1938 | Robinson | 113/102 |
| 2,256,527 A | 9/1941 | Ring | 33/181 |
| 3,901,604 A | * 8/1975 | Butler | 33/286 |
| 4,231,161 A | 11/1980 | Belfiore | 33/181 R |
| 4,249,294 A | 2/1981 | Belfiore | 33/645 |
| 4,672,751 A | 6/1987 | Jones | 33/286 |
| 5,285,708 A | 2/1994 | Bosten et al. | 83/520 |
| 5,375,495 A | 12/1994 | Bosten et al. | 83/520 |
| 5,715,609 A | 2/1998 | Nower | 33/645 |
| 5,987,762 A | * 11/1999 | Toth et al. | 33/227 |
| 6,098,297 A | * 8/2000 | Belfiore | 33/DIG. 21 |

* cited by examiner

*Primary Examiner*—G. Bradley Bennett
(74) *Attorney, Agent, or Firm*—Woodard, Emhardt, Naughton Moriarty & McNett (57) ABSTRACT

A pulley alignment tool for checking the centerline alignment between a driving pulley and a driven pulley which are connected by a V-belt includes a targeting laser which is constructed and arranged to generate a beam of light which will be directed from a location adjacent the driving pulley to a location on the surface of the driven pulley. The targeting laser is mounted in a holder and the holder is constructed and arranged for attachment into the groove of the driving pulley. As a preliminary step, the V-belt which initially connects the driving pulley and driven pulley is removed, thereby making the driving pulley groove accessible for mounting the holder. An elastic cord is used to encircle the driving pulley and is connected to opposite ends of the holder in order to maintain the holder in a fixed position on the surface of the driving pulley. The targeting laser is used to check the centerline alignment between the driving and driven pulleys. The uppermost edge of the driven pulley is used as one check point and the lowermost edge of the driven pulley is used a second check point. Cooperating support bracketry is used as the means to make adjustments in the position of the driven pulley. All of the required components for the pulley alignment tool are provided as part of a tool alignment kit.

14 Claims, 11 Drawing Sheets

PULLEY ALIGNMENT TOOL

BACKGROUND OF THE INVENTION

The present invention relates in general to alignment tools which are to be used to check, measure, or evaluate the extent or degree of alignment (or misalignment) between two or more components. More specifically the present invention relates to alignment tools which mount directly to one or more of the components which are to be aligned, such as V-belt pulleys. As used herein, the reference to a "V-belt" is intended to include traditional V-belt styles as well as poly-V styles and multi-V styles of belts and pulleys.

The proper alignment of pulleys, typically involving a V-belt coupling between the driving pulley and the driven pulley, is important in order to keep the V-belt from coming off one or both pulleys. Proper alignment is also important in order to prevent accelerated wear of the V-belt which can occur when the belt is not properly set within the grooves of each pulley, a result of the pulleys not being in proper alignment. If the V-belt comes off either pulley, the corresponding machinery must be shut down and the spacing between the driving and driven pulleys shortened or reduced in some fashion in order to either reconnect the existing V-belt or replace the old V-belt with a new V-belt. This shut down and replacement procedure results in downtime to the machinery and additional labor.

With regard to the concern over premature belt wear due to misaligned V-belt pulleys, the specific geometry of the V-belts and their cooperation with the shape of the grooves formed within each pulley results in a compatible match and minimal wear. The V-belts are designed with a protruding portion which is shaped to fit within the V-groove or V-grooves of the pulley. When the centerlines of the V-belt groove and the cooperating pulleys are not aligned, the V-belt will be canted or twisted in some fashion. As such, there will be greater edge wear and in turn earlier V-belt failure. While there are downtime and added labor expenses associated with premature V-belt failure, there is also the added expense of a new V-belt.

It is difficult to ascertain the degree of the alignment or misalignment by simply sighting from one pulley to the other pulley, and even a slight degree of misalignment can have an adverse effect. It is therefore important to have some way of evaluating the degree of groove centerline alignment between the two cooperating pulleys. It is also important to have a way to make alignment adjustments while concurrently evaluating the degree of alignment. If the alignment tool which is used for this alignment check and adjustment has to be removed or its use discontinued when making a centerline alignment adjustment, there could be an over correction or under correction and this type of a trial and error method is inefficient.

The driving pulley is generally regarded as the point of reference, due in part to its direct connection to a more substantial and stable portion of the corresponding machinery. The driving pulley normally cannot be configured with the support bracketry that is adjustable in order to make the proper pulley alignment. The driven pulley is typically the pulley which will experience and demonstrate some degree of misalignment. In the disclosure for the present invention, the driven pulley is positioned on a fan hub for a motor vehicle. This driven pulley may exhibit non-alignment with the driving pulley in one of three ways. The entire pulley may be laterally shifted along the axis of rotation or tilted such that the geometric plane of the groove centerline intersects the axis of rotation at some included angle other than 90 degrees. The tilting can be inwardly or outwardly, referring to the upper or top portion of the driven pulley.

As with a number of tools, instruments, and devices, the less complexity often contributes to the ease of use, the reliability, and efficiency and this is true for the present invention. By attaching the alignment tool to only one of the two cooperating pulleys, it takes less time to assemble and is more reliable as compared to devices which must be attached to both pulleys. As such, the present invention represents a novel and unobvious advance in the art.

SUMMARY OF THE INVENTION

An alignment tool for checking the centerline alignment between first and second cooperating pulleys according to one embodiment of the present invention comprises a targeting laser which is constructed and arranged to generate a beam of light, a holder constructed and arranged to attach to the first cooperating pulley, and including a receiving portion for receiving and retaining the targeting laser, the holder further including at least one adapter for direct interface with the first cooperating pulley, and a securing mechanism for securing the subassembly of the holder and the targeting laser to the first cooperating pulley such that the beam of light generated by the targeting laser is directed toward the second cooperating pulley so as to appear on a surface of the second cooperating pulley, the location of the beam of light as appearing directly on the second cooperating pulley being used to determine the degree of centerline alignment between the first and second cooperating pulleys.

One object of the present invention is to provide an improved pulley alignment tool.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific langauge will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
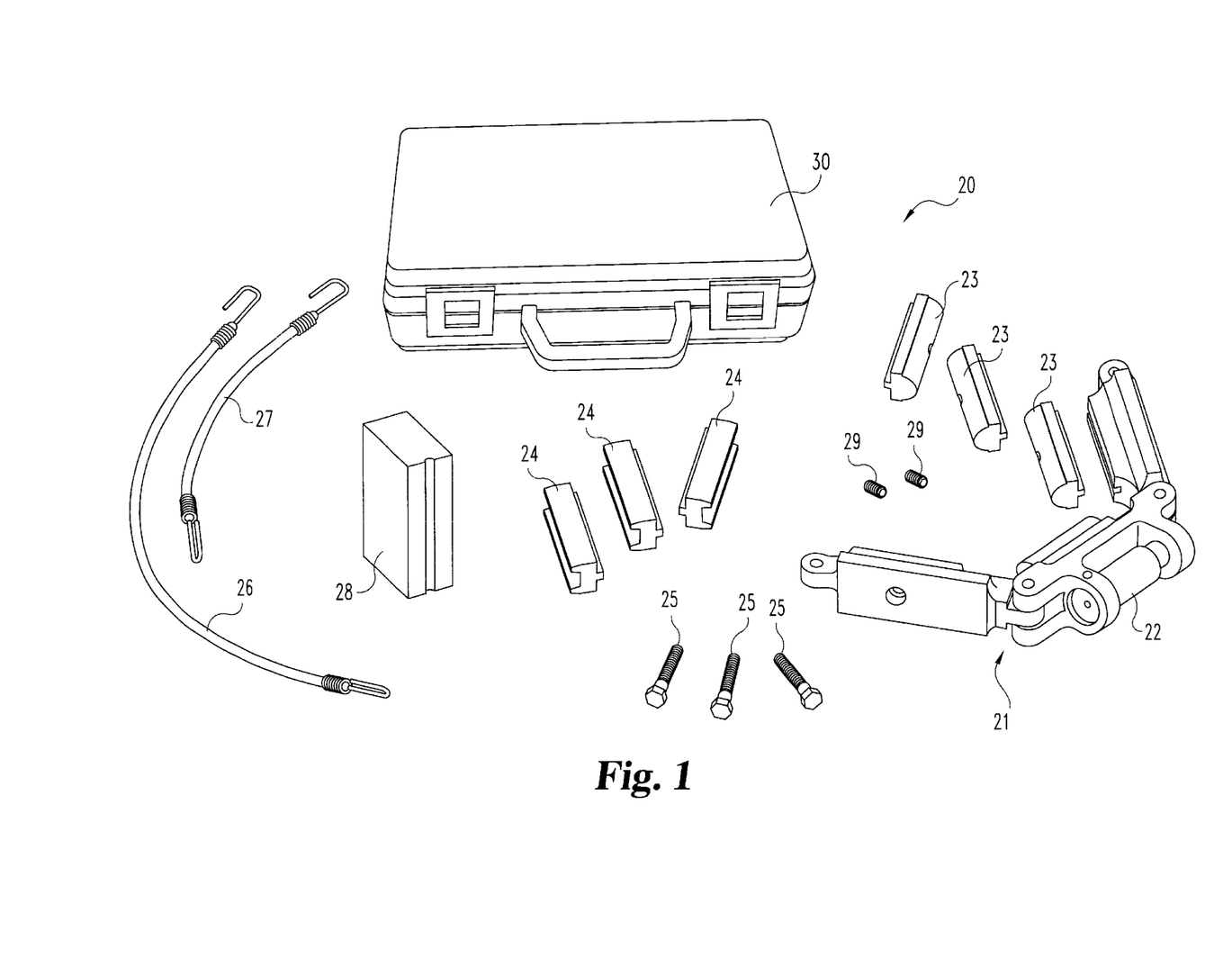
FIG. 1 is a perspective view of a pulley alignment kit including a pulley alignment tool according to the present invention.

Referring to FIG. 1 there is illustrated an alignment tool kit 20 for a pair of cooperating pulleys which are connected by a V-belt and wherein one pulley is the driving pulley and the other pulley is the driven pulley. The alignment tool kit 20 includes the following components in the quantity or quantities listed:

| Ref. No. | Item | Quantity |
| --- | --- | --- |
| 21 | Holder | 1 |
| 22 | Targeting laser | 1 |
| 23 | V-belt pulley adapter | 3 |
| 24 | Poly-V pulley adapter | 3 |
| 25 | Socket head screws | 3 |
| 26 | 10-inch elastic shock cord | 1 |
| 27 | 4-inch elastic shock cord | 1 |
| 28 | Alignment block | 1 |
| 29 | Set screws | 2 |
| 30 | Storage case | 1 |

Each of the first nine listed components, reference numbers 21–29, are placed in storage case 30 in order to keep all of the required components together and in order to provide convenience and portability to the alignment tool kit 20. The primary components which comprise the pulley alignment tool according to the present invention include the holder 21, the targeting laser 22 which is installed into the holder 21, one of the two sets of adapters 23 or 24, including the screws 25 for assembling the selected adapters to the holder 21, and one of the two elastic shock cords 26 or 27. The particular elastic shock cord which is selected is based upon the size of the driving pulley to which the holder 21 is attached so as to have sufficient spring tension such that the position of the holder is able to be maintained without slippage or shifting during the alignment procedure. The selection of one set of adapters as opposed to the other set is based on the geometry of the V-belt channel or poly-V channels in the driven pulley.

The set screws are installed into the holder and are used to make slight adjustment in the alignment of the targeting laser so that the light beam which is emitted from the targeting laser is aligned with the centerline of the holder 21 which in turn will be aligned with the centerline of the corresponding groove in the driving pulley. It is important that the light beam from the targeting laser be accurately directed along the centerline of the holder and the two set screws 29 are used for this purpose as will be described in greater detail hereinafter.

Figure 2A:
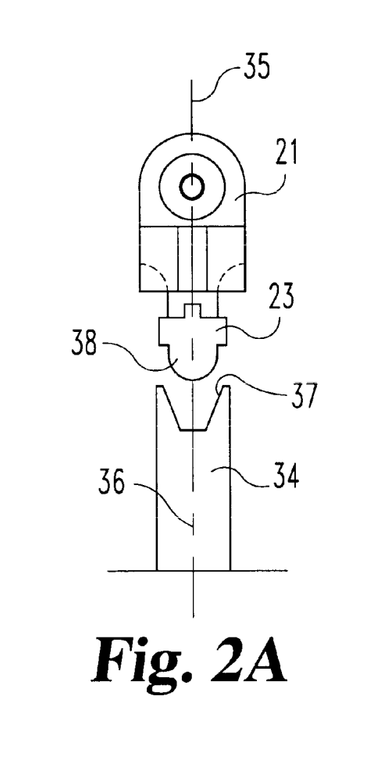
FIG. 2A is a diagrammatic, front elevational view of the interfit between a V-belt pulley adapter and the groove of a pulley, according to the present invention.
Figure 2B:
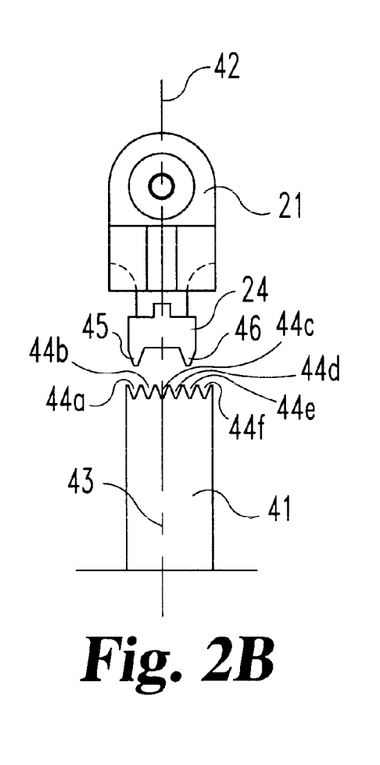
FIG. 2B is a diagrammatic, front elevational view of the interfit between a poly-V pulley adapter and the groove of a pulley, according to the present invention.
Figure 2C:
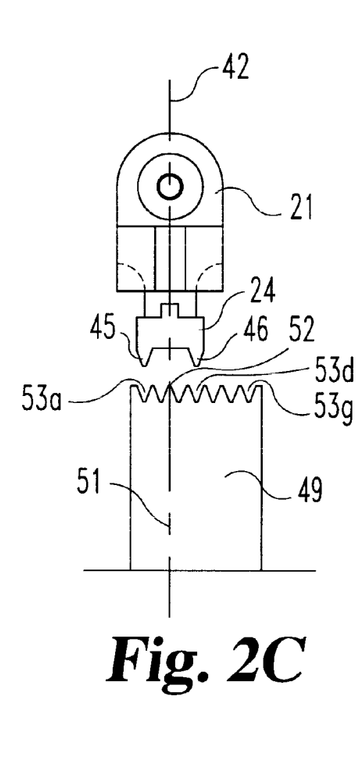
FIG. 2C is a diagrammatic, front elevational view of the interfit between a poly-V pulley adapter and the groove of a pulley, according to the present invention.

With reference to FIGS. 2A, 2B, and 2C, the most typical crosssectional configurations for V-belt pulleys, especially the type used in motor vehicles, are illustrated. FIG. 2A shows a traditional V-belt pulley 34. Included in this diagrammatic illustration is a view of one adapter 23 and a portion of holder 21. Line 35 represents the centerline of the holder 21 and adapter 23 and line 36 represents the centerline of the V-belt groove 37 of pulley 34. Adapter 23 is shaped with an inserted portion 38 which is constructed and arranged to fit within groove 37 and actually be self-centering. So long as the laser light beam is centered on the centerline of the holder, i.e., centerline 35, this light beam is also centered on the centerline 36 of the groove.

FIG. 2B illustrates one style of poly-V pulley 41 where the centerline 42 of the adapter 24 and holder 21 coincides with the centerline 43 of one groove 44c. The adapter 24 has a lower portion designed for engagement with the pulley grooves which includes a pair of spaced-apart projections 45 and 46. Each projection 45, 46 has a design and construction which is compatible with each of the individual grooves 44a–44f. Each projection 45, 46 has a size and spacing such that the adapter 24 fits into pulley 41 by projection 45 fitting into groove 44 a and by projection 46 fitting into groove 44e.

FIG. 2C illustrates another style of a poly-V pulley 49 where the centerline 42 of the adapter 24 and holder 21 coincides with the centerline 51 of one peak 52. When the groove spacing (i.e., width) is greater, as in FIG. 2C as compared to FIG. 2B, the projections 45 and 46 insert down into grooves 53a and 53d, respectively. Other than lining up on a peak instead of a groove, the interfit of adapter 24 into pulley 49 is the same as the interfit of adapter 24 into pulley 41. Additionally, the holder 21 (and adapter 24) can be positioned at any location laterally across the width of pulley 49 between grooves 53a and 53g.

Figure 3:
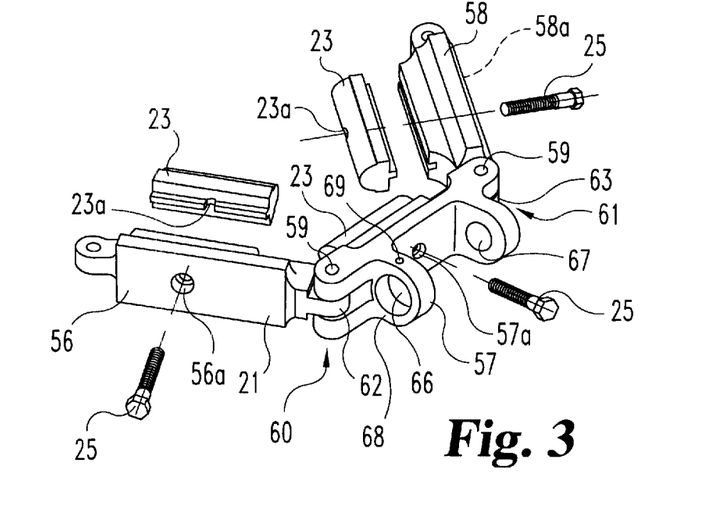
FIG. 3 is a perspective, exploded view of the assembly of V-belt pulley adapters to a holder according to the present invention.

With reference to FIG. 3, the assembly of the three adapters 23 to the holder 21 is illustrated. This exploded view shows that the holder 21 includes three sections 56, 57, and 58 which are connected end-to-end by pivot pin 59 connections. The clevis design at each end 60, 61 of each section 57 receives insert portion 62 and 63, respectively. Portion 62 is part of section 56 and portion 63 is part of section 58. The pivot pins 59 are sized for a slight press fit into the holes in the clevis end of section 57 and a slip fit with the hole in each portion 62 and 63. Each section 56, 57, and 58 includes a clearance hole 56a, 57a, and 58a, respectively, for socket head screws 25. These screws are secured by having an internally tapped and properly sized hole 23a in each of the three adapters 23.

The center section 57 of holder 21 is configured with two receiving bores 66 and 67 which are spaced apart and suitably sized to receive the targeting laser 22. The targeting laser which is battery operated has a generally cylindrical shape but with one end having a smaller diameter, similar to a traditionally flashlight. The smaller diameter end fits into bore 67 while the larger diameter end, which is the light emitting end, fits into bore 66. The sleeve 68 surrounding and defining bore 66 includes two internally-threaded holes 69 for receipt of the two set screws 29. These two internally-threaded holes 69 are positioned 180 degrees apart on what would effectively be the sides of sleeve 68 based on the orientation of holder 21 and section 57 when the holder 21 is secured in position on the driving pulley, according to the present invention. Due to the orientation of holder 21 in FIGS. 3, 4, and 6, only one threaded hole 69 and one set screw 29 are illustrated. These two set screws 29 are used to adjust and fine tune the direction of the emitted light beam so that it coincides with the centerline of the holder which in turn coincides with the centerline of the pulley groove in FIG. 2A. Although reference herein will typically be made to the V-belt pulley design of FIG. 2A, including the more detailed description of the alignment procedure, it is to be understood that the alignment procedure for a pulley with the configuration denoted in FIG. 2B will be virtually identical as will the alignment procedure for a pulley according to the FIG. 2C design. The alignment procedure which is described hereinafter directs the emitted light beam from the targeting laser on the groove of the driven pulley. In the FIG. 2A configuration, it is relatively easy to identify the centerline of that groove and where the light beam strikes that groove relative to its centerline. The same would be true with regard to either FIG. 2B or FIG. 2C. In FIG. 2B, it is simply a matter of identifying which individual groove constitutes the appropriate centerline for proper pulley alignment. With regard to FIG. 2C, a peak instead of a groove is used as the centerline reference and thus the location of the emitted light beam relative to that peak will be used to determine the degree of alignment and to make appropriate adjustments.

Figure 4:
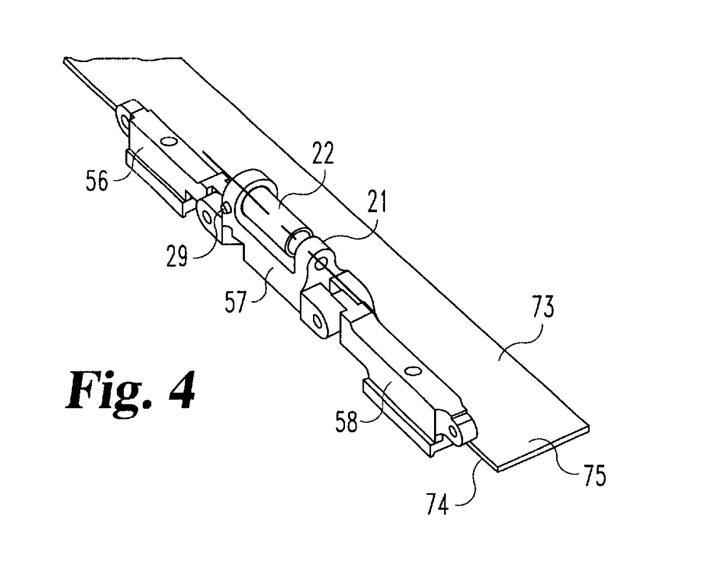
FIG. 4 is a perspective view of one step in the alignment procedure for a targeting laser installed within the FIG. 3 holder according to the present invention.

Referring now to the FIG. 4 illustration, what is disclosed is a technique for initial alignment and centering of the targeting laser 22, actually the light beam emitted by the targeting laser, relative to the longitudinal centerline of holder 21. With the holder 21, adapters 23 (or adapters 24, depending on the belt style) and targeting laser 22 all assembled, this subassembly is extended into an elongate orientation with each of the three holder sections 56, 57, and 58 set end-to-end. A straightedge 73, such as a one meter stick or bar, is provided and the subassembly is positioned flush against one straight edge 74 at one end 75 of the straightedge 73. The alignment block 28 is placed flush against the same edge 74 at the opposite end 76 of the straightedge 73 (see FIG. 5) such that the light beam to be emitted by the targeting laser is directed at the alignment block 28.

Figure 5:
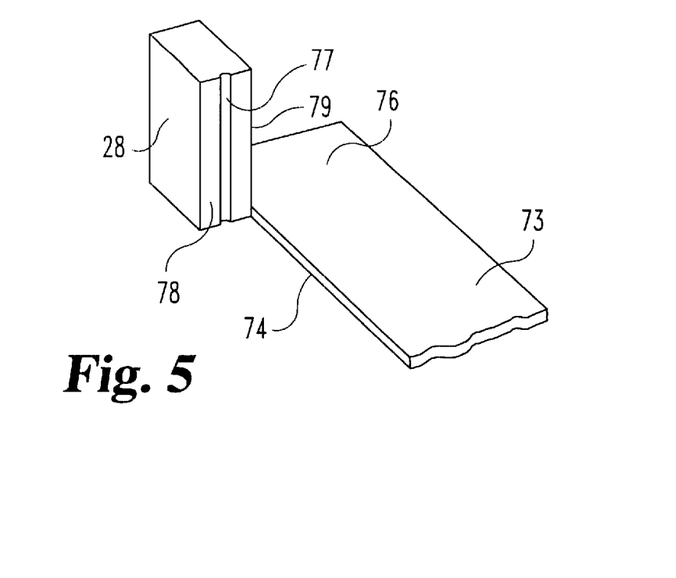
FIG. 5 is a perspective view of another step in the alignment procedure for the FIG. 4 targeting laser.

The alignment block 28 is a generally rectangular solid with a longitudinal groove 77 centered in one side 78. The alignment block is positioned with one face 79 against edge 74 such that the groove 77 extends in a vertical direction and faces the light emitting end of the targeting laser 22. The alignment procedure continues by turning on or activating the targeting laser 22 such that a light beam is directed toward groove 77. The dimensions of the holder 21 and the alignment block 28, as well as the positioning of the targeting laser within the holder are all predetermined and set such that the emitted light beam, if aligned, should strike the center of groove 77. If this is not the case, then the targeting laser needs to be adjusted, slightly, by the use of the two set screws 29 (see FIG. 6). A visual indication of the light beam location relative to groove 77 is sufficient due to the relative narrow width of groove 77.

Figure 6:
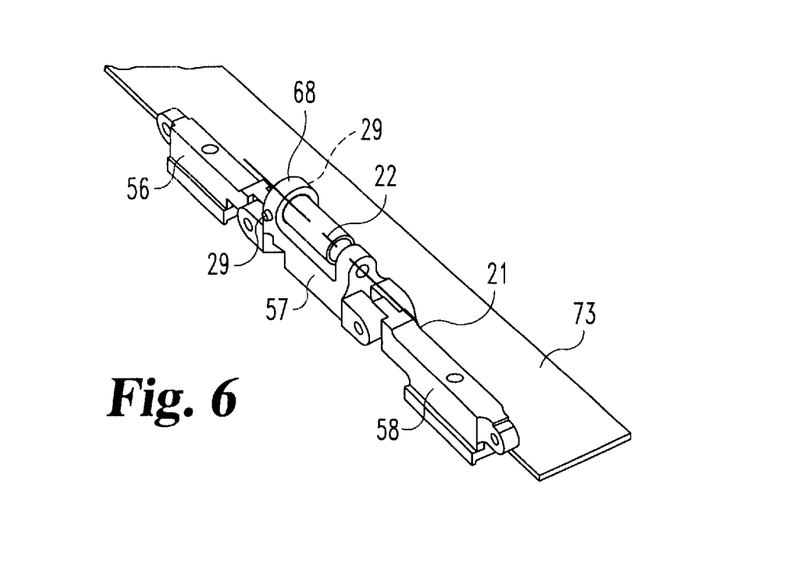
FIG. 6 is a perspective view of a still further step in the alignment procedure for the FIG. 4 targeting laser according to the present invention.

With reference to FIG. 6 it will be seen that the set screws 29 are positioned within the threaded holes 69 in sleeve 68 which surrounds the light-emitting end of the targeting laser.

If the light beam spot as appearing on the alignment block is not on the centerline of groove 77, then some slight adjustment or realignment of the targeting laser is needed. Depending on the direction the targeting laser has to be shifted, the set screw on that same side is loosened. The other set screw is then advanced with clockwise rotation into the corresponding threaded hole so that the inner tip of the set screw pushes against the targeting laser, pushing the targeting laser in the direction of the other set screw. Both set screws are designed and used to push the targeting laser into alignment, depending on which direction the targeting laser needs to be moved. As the set screw is advanced, the light beam location on the alignment block is observed. Once the light beam spot is centered in the groove, the alignment procedure is completed. The only remaining step is to tighten the set screw that was initially loosened. As this screw is tightened, the light location is observed to insure that the precise alignment remains. If the pushing on the targeting laser goes too far or if the targeting laser is initially off center on the opposite side of the groove, the procedure involving the two set screws is reversed.

Now that the holder and targeting laser are assembled and the laser is aligned, it is time to mount the holder onto the driving pulley. In order to do so, the V-belt connecting the driving pulley and the driven pulley needs to be removed. If this belt is worn, frayed, twisted, or cut, it may be time to replace the belt. If so, simply cut the belt away and discard it. Even if the existing belt is not to be discarded and replaced with a new belt, it still needs to be removed. In order to do so, the driven pulley needs to be moved closer to the driving pulley in order to loosen or relieve the belt tension and thereby make it possible to remove the belt from the pulleys. The belt needs to be removed from both pulleys for two reasons. First, the belt needs to be removed from the driving pulley so that the holder can be mounted to the driving pulley. Secondly, the belt needs to be removed from the driven pulley because the groove of this pulley (assuming the FIG. 2A configuration) is used as the target for the beam of light emitted from the targeting laser.

While it will be obvious to a person of ordinary skill in the art as to how to loosen the controlling hardware and bracketry so as to move the driven pulley closer to the driving pulley, depending on the specific device, a couple of examples are provided. The example which is provided in FIGS. 7 and 8 corresponds to one configuration for the fan hub of a Cummins Engine Company N 14-type diesel engine. The example illustrated in FIGS. 9 and 10 also corresponds to the fan hub of a diesel engine, but with a slightly different pulley mounting arrangement.

Figure 7:
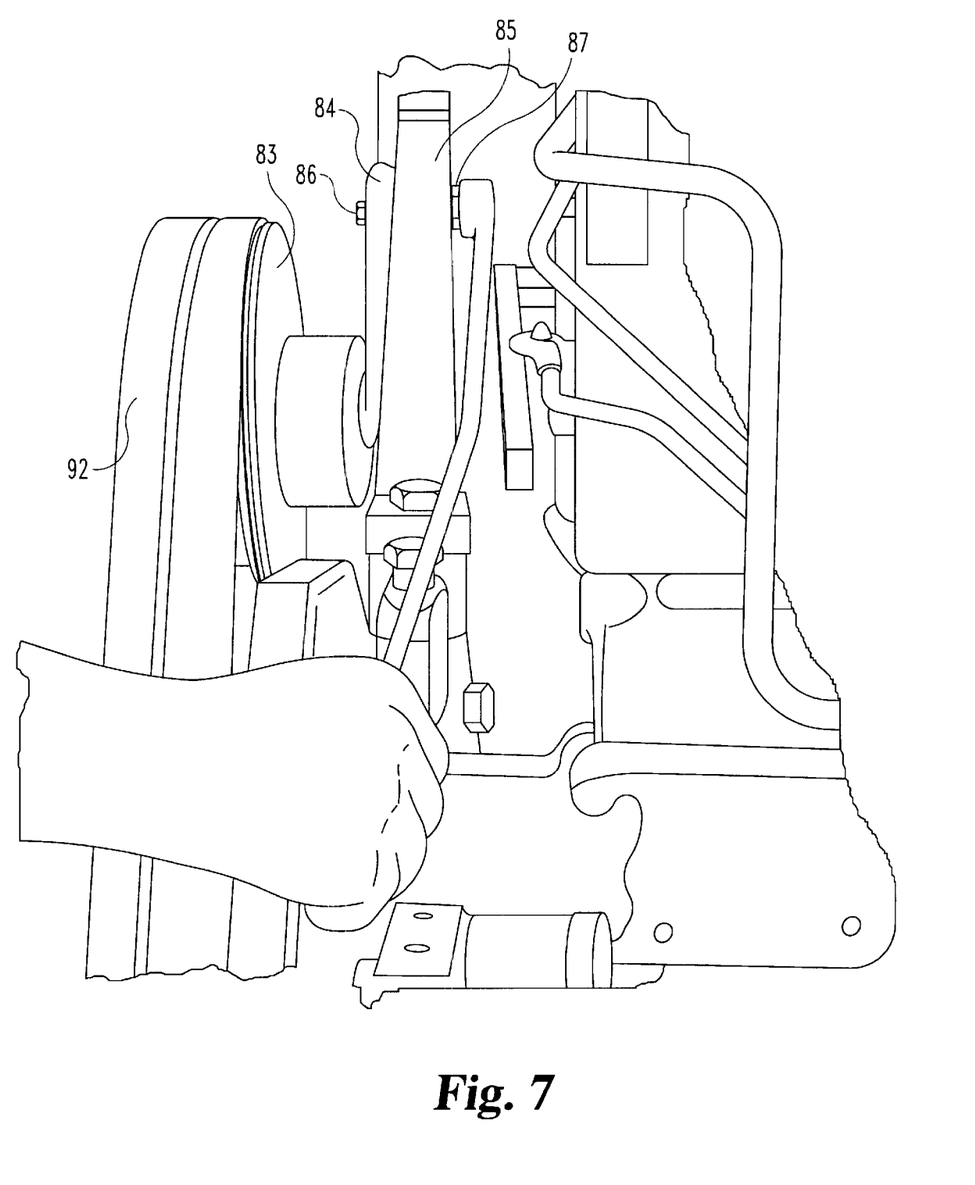
FIG. 7 is a perspective view of one fan hub configuration associated with a driven pulley according to the present invention.
Figure 8:
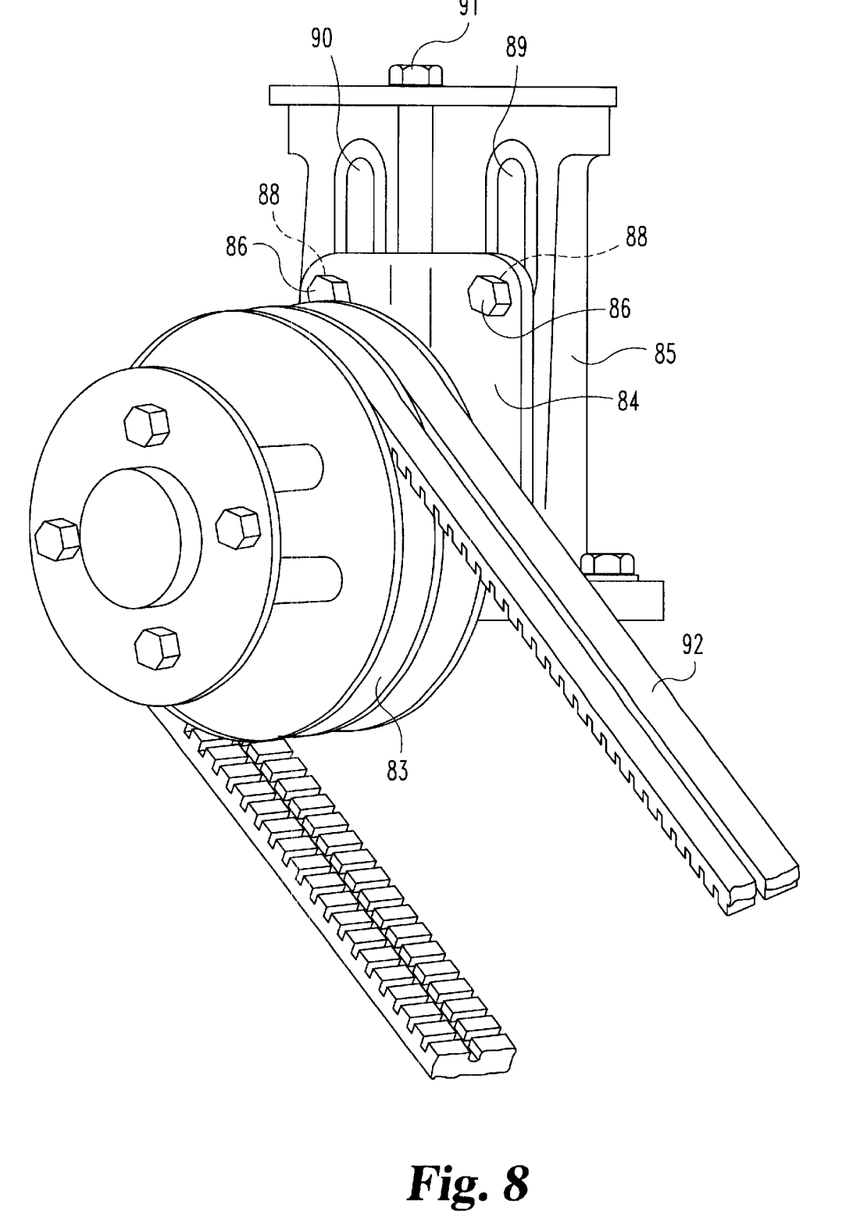
FIG. 8 is a perspective view of the FIG. 7 pulley and fan hub configuration.

With reference to FIGS. 7 and 8, the driven pulley 83 is connected to the fan hub 84 which is attached to support bracket 85 by means of four cap screws 86. The cap screws are tightened into position by cooperating hex nuts 87. The cap screws extend through corresponding clearance holes 88 in fan hub 84 and then through one of the two cooperating oblong slots 89 or 90 defined by support bracket 85. Additionally, the position of the support bracket 85 is controlled by adjusting screw 91 which acts on fan hub 84.

In order to release the tension on V-belt 92, the four cap screws 86 are first loosened. It is to be noted that the cap screws can be inserted from either direction through the slots 89 and 90 and clearance holes 88 with the cooperating hex nuts 87 located on the "back" side. In the FIG. 7 illustration the heads of the cap screws are on the side of the support bracket 85 which is toward the driven pulley 83. The four cap screws 86 (and hex nuts 87) are not removed, only loosened. Thereafter the adjusting screw 91 is turned in a counterclockwise direction in order to release the tension on the connecting V-belt 92. With the tension released, the V-belt 92 is removed from the driven pulley 83 and from the driving pulley (not illustrated in FIGS. 7–10).

Figure 9:
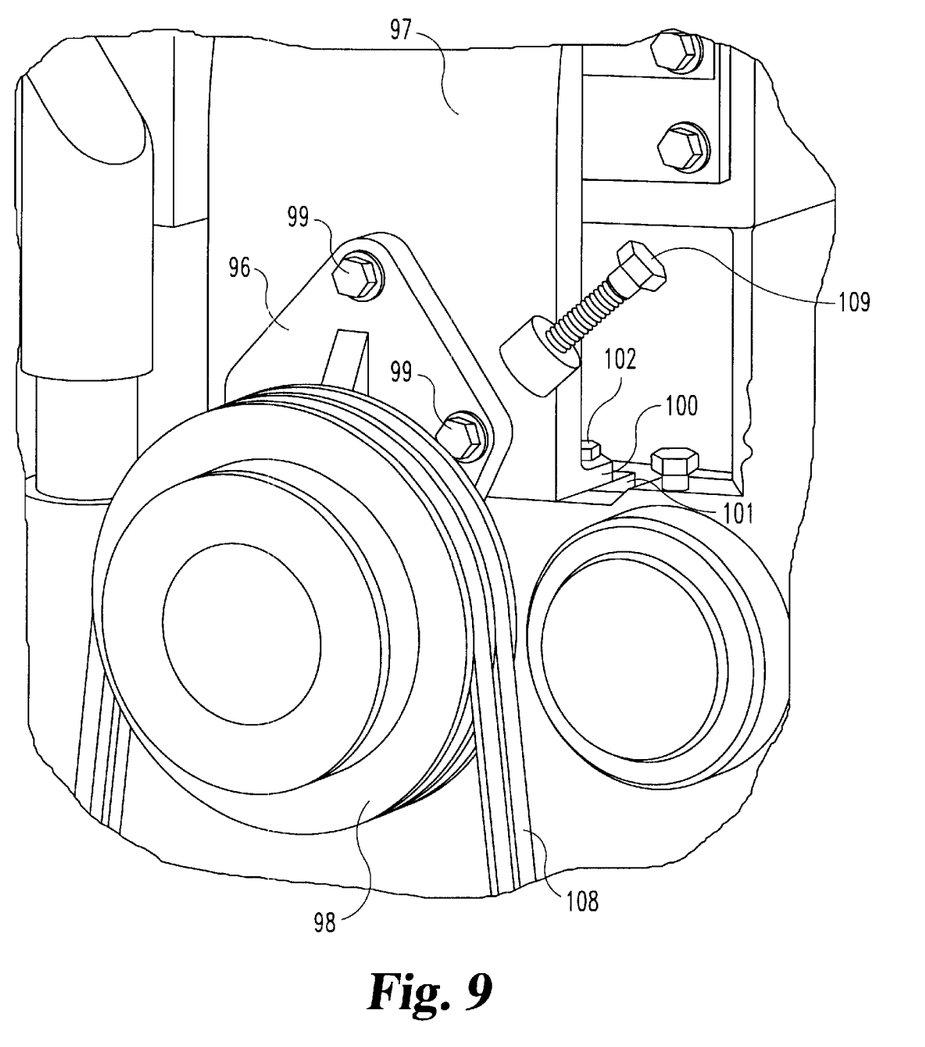
FIG. 9 is a perspective view of another pulley and fan hub configuration, including supporting brackets, according to the present invention.
Figure 10:
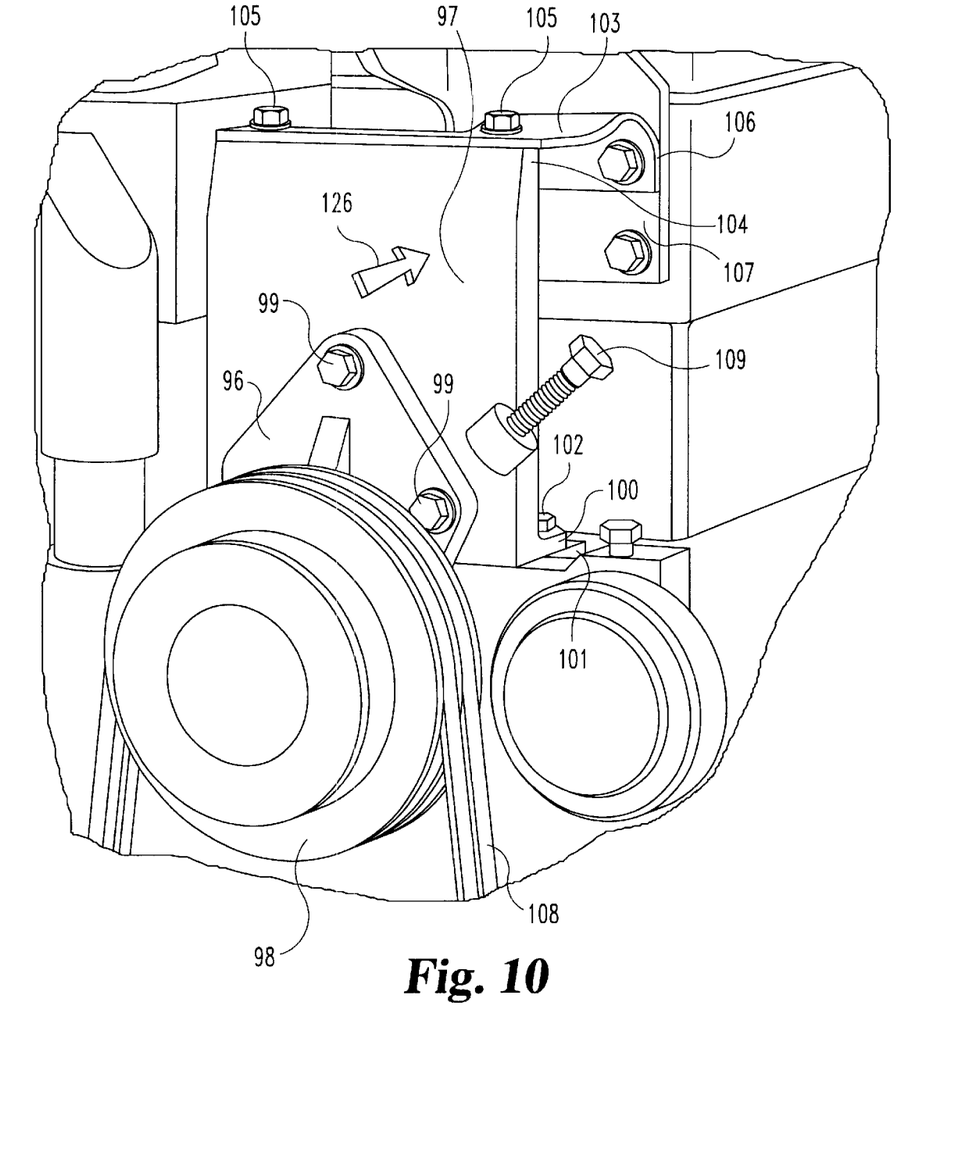
FIG. 10 is a perspective view of the FIG. 9 configuration.

With reference to FIGS. 9 and 10, the fan hub 96 is attached to a first bracket 97 which is secured to additional structural elements of the engine. The driven pulley 98 is supported by the fan hub 96 and the fan hub is secured to the first bracket 97 by three cap screws 99. The lower flange 100 of first bracket 97 is attached to base 101 by two cap screws 102. Additionally, L-bracket 103 is attached to the upper end 104 of first bracket 97 by two cap screws 105. The opposite edge 106 of the L-bracket 103 is attached to wall 107.

In order to shift the position of the driven pulley 98 for removal of the V-belt 108, the lower two cap screws 99 are loosened and removed. The adjusting screw 109 is then loosened so that the fan hub can be pivoted. The pivoting movement allows the driven pulley 98 to swing closer to the driving pulley (not illustrated) which relieves the tension on V-belt 108 and allows this belt to be removed from each pulley.

After the V-belt is removed and before proceeding with the remaining steps in the pulley alignment procedure using kit 20, the driven pulley needs to be returned to its prior position where it was set for the desired V-belt tension. As would be understood, in order to align the driving and driven pulleys, they need to be positioned as they would be during normal operation. Since one pulley has been moved in order to relieve the belt tension and thereafter remove the belt, that pulley needs to be moved back to its original or starting position. It is therefore important to carefully mark the original position of the pulley which will be moved so that it can be returned to that original position.

With the V-belt removed from the driving pulley and from the driven pulley, the holder is attached to the driving pulley. The driven pulley is used to gauge where the light beam from the targeting laser strikes so that the nature and magnitude of any pulley misalignment can be assessed. For this portion of the description of the present invention, the pulley arrangement of FIGS. 9 and 10 will be used. However, it is to be understood that the alignment procedure is the same as between the arrangement of FIGS. 9 and 10 and the arrangement of FIGS. 7 and 8, as far as the initial determination of pulley alignment. If the two pulleys are not correctly aligned, the position of the driven pulley is adjusted until it is correctly aligned. While the holder 21 is preferably attached to the driving pulley and the driven pulley is adjusted, the reverse is possible and contemplated by the present invention, depending on the particular configuration. In other words, while the description of FIGS. 7–10 focuses on the attachment of the holder to the driving pulley and using the driven pulley as the target object for the targeting laser, it is anticipated that the holder can be attached to the driven pulley and then use the driving pulley as the target object, all of which would depend on the particular pulley arrangement and the style of the engine or other mechanism.

Figure 11:
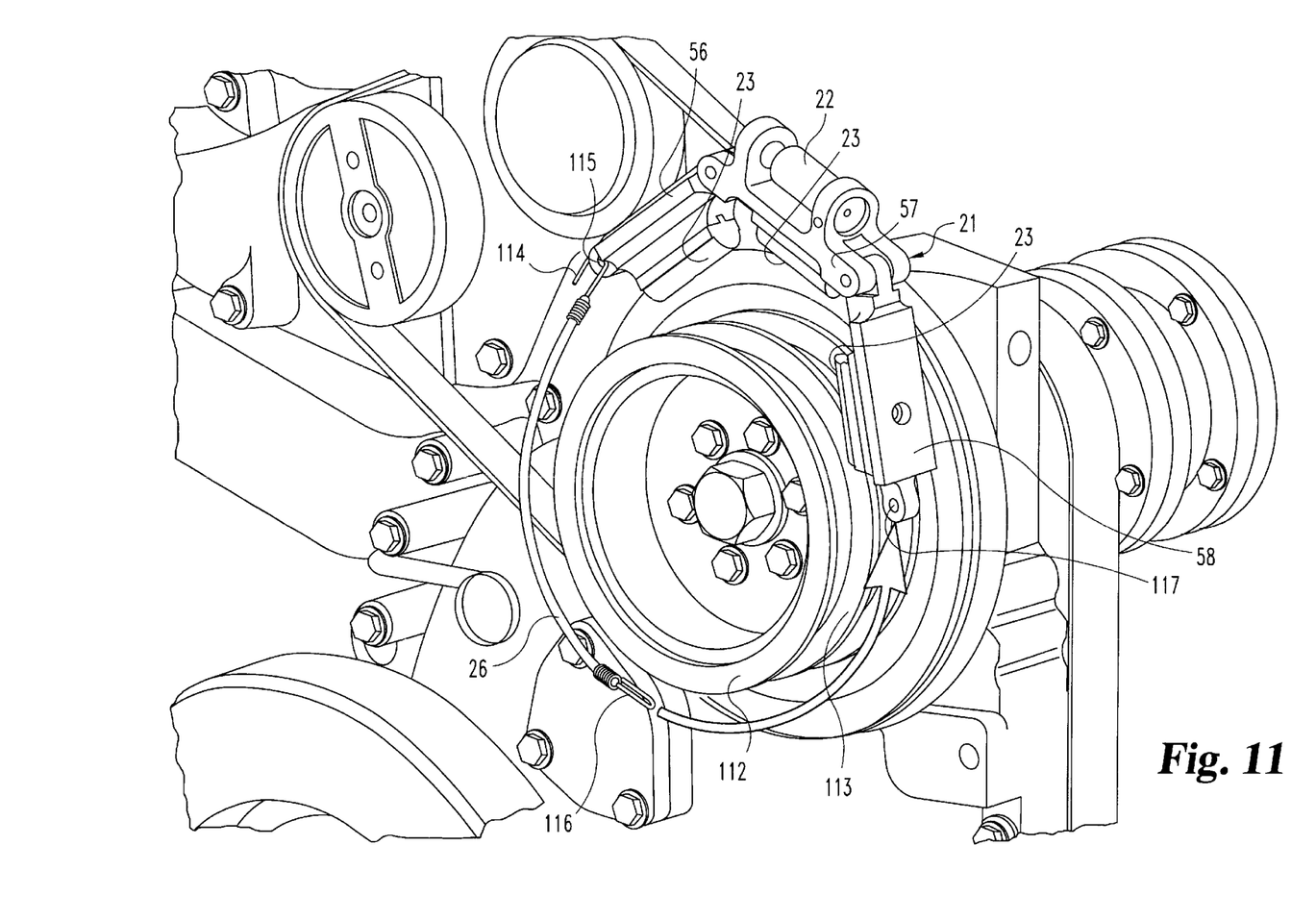
FIG. 11 is a perspective illustration of the attachment of the FIG. 3 holder, with the targeting laser, to a driving pulley according to the present invention.
Figure 12:
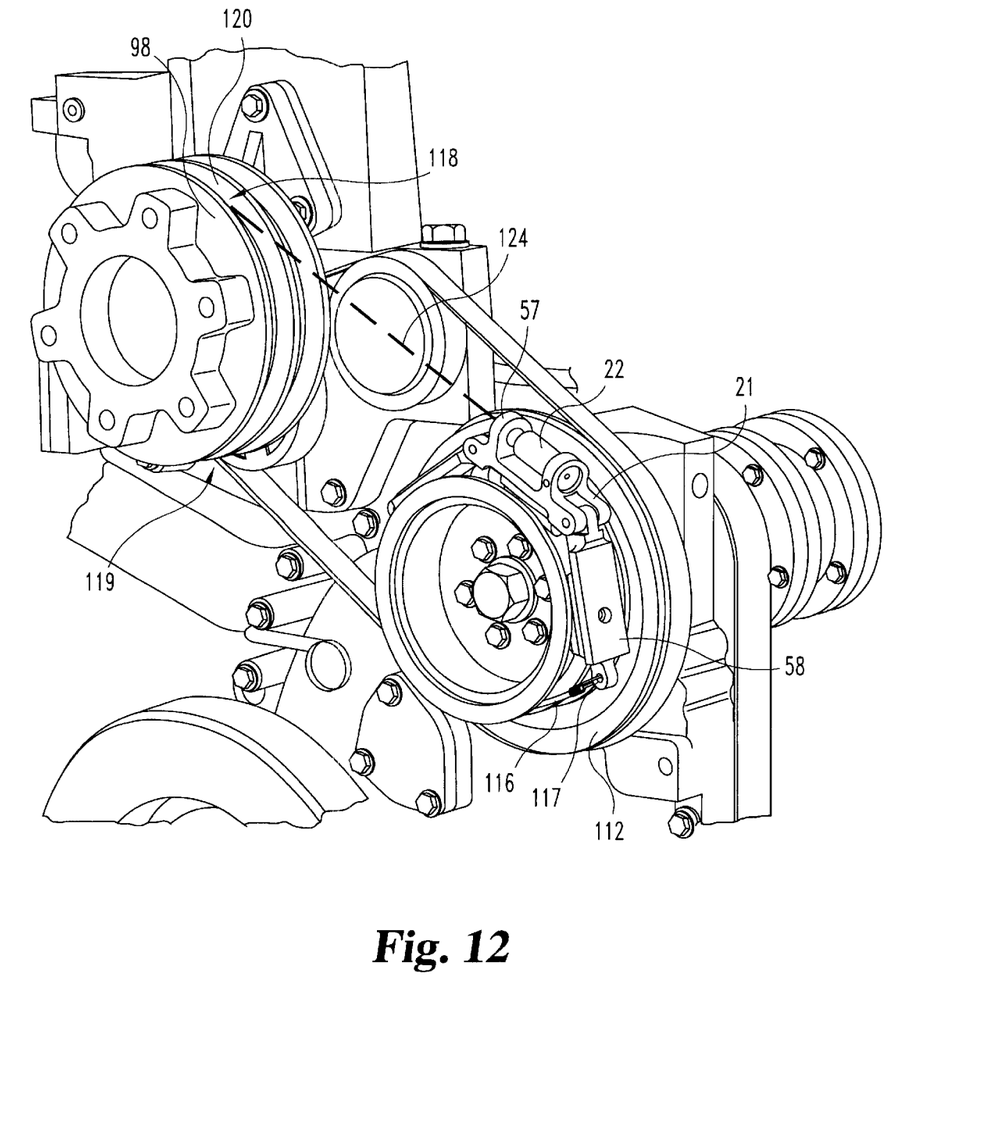
FIG. 12 is a perspective view of one step in the pulley alignment procedure according to the present invention where a light beam from the targeting laser is directed at the driven pulley.
Figure 13:
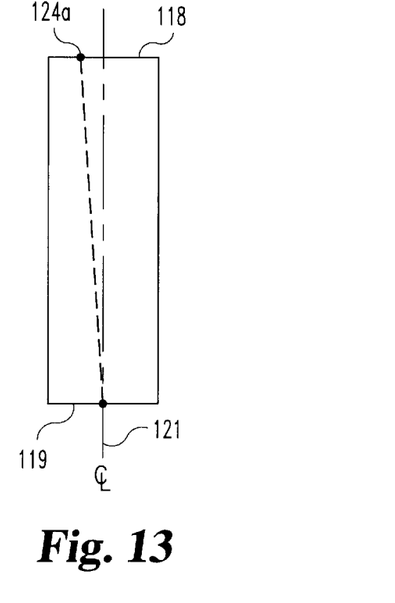
FIG. 13 is a diagrammatic illustration of one possible configuration where the driven pulley is misaligned.
Figure 14:
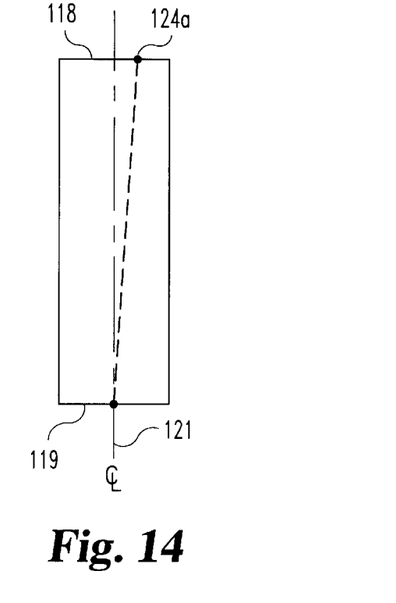
FIG. 14 is a diagrammatic illustration of another possible configuration where the driven pulley is misaligned.
Figure 15:
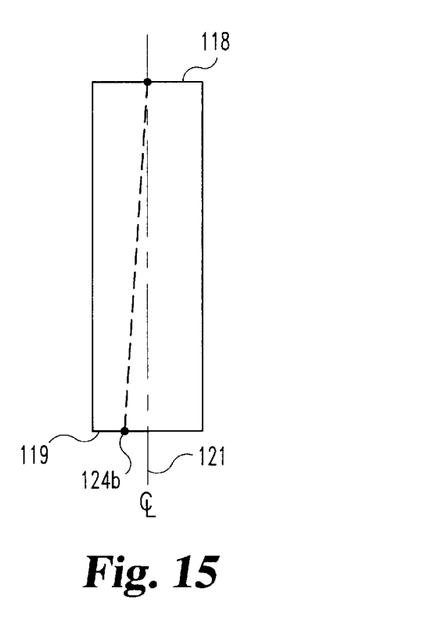
FIG. 15 is a diagrammatic illustration of another possible configuration where the driven pulley is misaligned.
Figure 16:
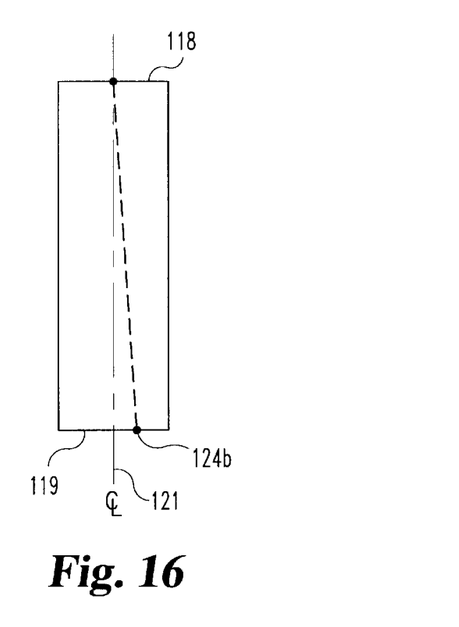
FIG. 16 is a diagrammatic illustration of another possible configuration where the driven pulley is misaligned.

With reference to FIGS. 11 and 12, the attachment of the holder 21 to the driving pulley 112 begins with placement of the V-belt pulley adapters which are attached to sections 56, 57, and 58 into the groove 113 of the pulley. The orientation of holder 21 is such that the light beam generated by the targeting laser is directed at the groove of the driven pulley. One of the elastic shock cords 26 or 27 of kit 20 is then selected and the cord hook 114 on one end of the selected elastic shock cord is inserted into aperture 115 at the free end of section 56. The cord is then wrapped around the circumference of the groove in the driven pulley. Thereafter, the other cord hook 116 on the opposite end is inserted into aperture 117 at the free end of section 58. The selection of either cord 26 or cord 27 depends on the circumference of the pulley groove. Cord 26 is ten inches in length and cord 27 is four inches in length. The selection criteria is to securely anchor the holder to the driving pulley. Since the elastic cords can only be stretched so far, if the stretched four inch cord will not reach to the second aperture, a longer cord is needed. Based upon the typical groove circumferences associated with pulleys of this type and considering the length of the holder, a choice between a four inch cord and a ten inch cord is believed to be adequate for the FIG. 1 alignment tool kit 20. However, other cord lengths can be included as part of kit 20, either in addition to cords 26 and 27 or as a replacement for either of the two cords.

With the targeting laser 22 activated and the generated light beam directed at the groove 120 of the driven pulley 98, the driving pulley is rotated until the light beam is directed at the uppermost edge 118 of groove 120. The lateral location of the light beam as it strikes the uppermost edge of groove 120 is visually checked relative to the groove centerline 121 (see FIGS. 13–16). If the light beam is not at the center of the groove, the position of the pulley needs to be adjusted so that the light beam is centered, i.e., on centerline 121. The adjustment procedure is described hereinafter. The targeting step, and as necessary the adjusting step, are repeated for the lowermost edge 119 of the pulley groove. After checking the uppermost edge 118 and making any necessary adjustments to the position of the pulley based on the uppermost edge centerline alignment, the driving pulley is rotated in the direction of the driven pulley until the light beam from the targeting laser strikes the lowermost edge 119 of the pulley groove. The centerline alignment is again visually checked and the position of the driven pulley 98 is adjusted as required in order to establish centerline alignment between the centerline of the groove 120 and the centerline of the holder which corresponds to the centerline of the light beam and to the centerline of the driving pulley groove 113.

As described, it is envisioned that the upper edge of the driven pulley can be checked for alignment and adjusted prior to checking the lower edge of the driven pulley. It is also contemplated by the present invention that preliminary checks would be made by the holder and targeting laser on both the upper edge of the driven pulley groove and on the lower edge of the driven pulley groove so as to have some sense of the overall alignment or misalignment picture. Since it is relatively easy to rotate the driving pulley, both in a clockwise as well as a counterclockwise direction, it is very quick and efficient to repeatedly check the centerline alignment of the driven pulley and to recheck that alignment as adjustments are made.

The adjustment procedure for the configuration illustrated in FIGS. 7, 8, 9, and 10 depends on where the light beam target spot is positioned relative to the centerline of the groove. While two different fan hub styles have been described, one of FIGS. 7 and 8 and the other of FIGS. 9 and 10, the adjustment procedure is the same for both. The support structure and L-bracket of FIGS. 9 and 10 is present with the fan hub configuration of FIGS. 7 and 8; it is simply not illustrated. A single such illustration, (i.e., FIGS. 9 and 10) is sufficient for a complete understanding. The primary differences between the two styles or configurations relate to how the belt tension is relieved which depends on how the driven pulley is moved. In the style of FIGS. 7 and 8, the driven pulley moves by a sliding action in a vertical direction. In the style of FIGS. 9 and 10, the driven pulley moves by a pivoting or swinging action.

The adjusting procedure for the fan hub 96 and thus for the centerline alignment of the driven pulley 98 relative to the centerline of the driving pulley 112 begins with a visual assessment of where the light beam 124 from the targeting laser 22 strikes the uppermost and lowermost edges of pulley groove 120. If the light beam location 124a indicates that the uppermost edge 118 of the driven pulley 98 is not aligned with the pulley groove centerline 121 (see FIGS. 13 and 14), the next step in the alignment procedure is to loosen the two cap screws 105 that connect the upper end 104 of the first bracket 97 to the L-bracket 103. This allows the upper portion of the first bracket 97 to shift slightly (i.e., a slight pivot) with a lower flange 100 held in a stationary position against base 101 by cap screws 102. The shifting or pivoting direction of the upper end 104 of the first bracket 97 tends to return to an aligned state, but can be manually assisted and may need to be manually assisted by the mechanic by tapping the top edge of the driven pulley 98 inwardly a little (FIG. 13) or outwardly a little (FIG. 14) to establish centerline alignment. Before retightening the two cap screws 105, it is important to insure that the lowermost edge 119 of the driven pulley has not shifted and that there is centerline alignment from the uppermost edge 118 through to the lowermost edge 119.

If the light beam location 124 b indicates that the lowermost edge 119 of the driven pulley 98 is not aligned with the pulley groove centerline 121 (see FIGS. 15 and 16), the next step in the alignment procedure is to loosen the two cap screws 102 which anchor the lower flange 100 to the support base 101. This allows the lower portion of the first bracket 97 to shift slightly (i.e., a slight pivot) with the upper end 104 held in a stationary position against the L-bracket 103 by cap screws 105. The shifting or pivoting direction of the lower flange 100 of the first bracket 97 tends to return to an aligned state, but can be manually assisted and may need to be manually assisted by the mechanic by tapping the lower flange inwardly a little (FIG. 16) or outwardly a little (FIG. 15) in order to establish centerline alignment with groove centerline 121 of the driven pulley 98. Before retightening the two cap screws 102, it is important to insure that the uppermost edge 118 of the driven pulley is not shifted and that there is in fact centerline alignment from the lowermost edge 119 to the uppermost edge 118.

If the driven pulley 98 is out of alignment such that both the uppermost edge 118 and the lowermost edge 119 are not centered, all four cap screws 102 and 105 are to be loosened so that the first bracket can be adjusted at upper end 104 and at the lower flange 100. After centerline alignment, the four cap screws are retightened and, as this cap screw retightening occurs, it is important to check and recheck the uppermost edge 118 and the lowermost edge 119 alignment so insure that the established pulley groove alignment does not change during the cap screw retightening phase.

The preferred sequence for retightening of the four cap screws is to begin with the two cap screws 102 and loosely tighten those two cap screws while checking the pulley groove alignment. Next, loosely tighten cap screws 105 while maintaining the centerline alignment between the two pulleys. The final tightening step for cap screws 102 is performed while applying pressure on the fan hub 96 in the direction of allow 126. The cap screw 102 to the right side of arrow 126 is finally tightened first and then the cap screw on the left of arrow 126 is finally tightened. Cap screws 105 can be finally tightened in any order as the concluding step.

After final adjustment, alignment and cap screw retightening, the holder 21 is removed from the driving pulley. Next, the driven pulley is shifted so that a new V-belt (or the removed V-belt) can be reinstalled over the driven pulley and the driving pulley. The pulley movement is achieved by pivoting action for the configuration of FIGS. 9 and 10 and by vertical sliding action for the configuration of FIGS. 7 and 8.

With the pulley alignment completed and the V-belt assembled, the pulley arrangement is ready for system operation. The components used for the pulley alignment are returned to the storage case 30 in order to reestablish the completeness of kit 20.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An alignment tool for checking the centerline alignment between first and second cooperating pulleys, said alignment tool comprising:

a targeting laser constructed and arranged to generate a beam of light;

a holder constructed and arranged to attach to said first cooperating pulley, said holder including three sections which are pivotally connected end-to-end, one of said three sections including a receiving portion for receiving and retaining said targeting laser;

securing means for securing the holder with said targeting laser received therein to said first cooperating pulley such that said beam of light is directed toward said second cooperating pulley so as to appear on a surface of said second cooperating pulley, the location of the beam of light as appearing on said second cooperating pulley being used to visually determine the degree of centerline alignment between said first and second cooperating pulleys; and a plurality of replaceable adapters for receipt by a plurality of said three sections, each of said plurality of replaceable adapters being constructed and arranged for direct interface with said first cooperating pulley.

2. An alignment tool for checking the centerline alignment between first and second cooperating pulleys, said alignment tool comprising:

a targeting laser constructed and arranged to generate a beam of light;

a holder constructed and arranged to attach to said first cooperating pulley and including a receiving portion for receiving and retaining said targeting laser;

securing means for securing the holder with said targeting laser received therein to said first cooperating pulley such that said beam of light is directed toward said second cooperating pulley so as to appear on a surface of said second cooperating pulley, the location of the beam of light as appearing on said second cooperating pulley being used to visually determine the degree of centerline alignment between said first and second cooperating pulleys; and said receiving portion including a pair of oppositely-disposed adjustment screws for shifting the direction of said beam of light depending on the degree of threaded engagement of said adjustment screws with said receiving portion.

3. The alignment tool of claim 2 wherein said holder includes a plurality of sections which are hinged together end-to-end such that said holder has two oppositely-disposed free ends.

4. The alignment tool of claim 3 wherein one of said plurality of sections includes said receiving portion.

5. The alignment tool of claim 4 wherein each of said plurality of sections includes an adapter portion which is constructed and arranged to fit within a groove portion of said first cooperating pulley.

6. The alignment tool of claim 5 which further includes a spring member which is constructed and arranged to connect to one of said two oppositely-disposed free ends and to extend partly around said first cooperating pulley and connect to the other one of said two oppositely-disposed free ends.

7. The alignment tool of claim 6 wherein each adapter portion is provided by a replaceable adapter component which is assembled to a corresponding one of said plurality of sections.

8. An alignment tool for checking the centerline alignment between first and second cooperating pulleys, said alignment tool comprising:
   a targeting laser constructed and arranged to generate a beam of light;
   a holder constructed and arranged to attach to said first cooperating pulley and including a receiving portion for receiving and retaining said targeting laser;
   securing means for securing the holder with said targeting laser received therein to said first cooperating pulley such that said beam of light is directed toward said second cooperating pulley so as to appear on a surface of said second cooperating pulley, the location of the beam of light as appearing on said second cooperating pulley being used to visually determine the degree of centerline alignment between said first and second cooperating pulleys; and
   said holder including a plurality of sections which are hinged together end-to-end such that said holder has two oppositely-disposed free ends.

9. The alignment tool of claim 8 wherein each of said plurality of sections includes an adapter portion which is constructed and arranged to fit within a groove portion of said first cooperating pulley.

10. The alignment tool of claim 9 wherein each adapter portion is provided by a replaceable adapter component which is assembled to a corresponding one of said plurality of sections.

11. The alignment tool of claim 8 which further includes a spring member which is constructed and arranged to connect to one of said two oppositely-disposed free ends and to extend partly around said first cooperating pulley and connect to the other one of said two oppositely-disposed free ends.

12. A pulley alignment kit for checking the centerline alignment between first and second cooperating pulleys, wherein said first cooperating pulley may have one of two styles, said pulley alignment kit comprising:
   (a) a targeting laser constructed and arranged to generate a beam of light;
   (b) a holder constructed and arranged to attach to said first cooperating pulley, said holder including three sections which are pivotally connected end-to-end, one of said three sections including a receiving portion for receiving and retaining said targeting laser, said holder having two oppositely-disposed free ends;
   (c) a plurality of a first style of replaceable adapters for receipt by a plurality of said three sections, each of said plurality of said first style of replaceable adapters being constructed and arranged for direct interface with a first style of said first cooperating pulley;
   (d) a plurality of a second style of replaceable adapters for receipt by a plurality of said three sections, each of said plurality of said second style of replaceable adapters being constructed and arranged for direct interface with a second style of said first cooperating pulley;
   (e) an elastic shock cord for connecting to one of said two oppositely-disposed free ends and for extending partly around said first cooperating pulley and for connecting to the other one of said two oppositely-disposed free ends; and
   (f) a plurality of threaded fasteners for attaching said plurality of a first style of adapter to said holder and alternatively for attaching said plurality of a second style of adapter to said holder.

13. The pulley alignment kit of claim 12 which further includes another elastic shock cord having a length which is different from the length of the first elastic shock cord.

14. The pulley alignment kit of claim 13 which further includes an alignment block for use in initial alignment of said targeting laser relative to said holder.

* * * * *